(No Model.)
R. HOLMES.
METALLIC PACKING.
No. 536,206.                    Patented Mar. 26, 1895.
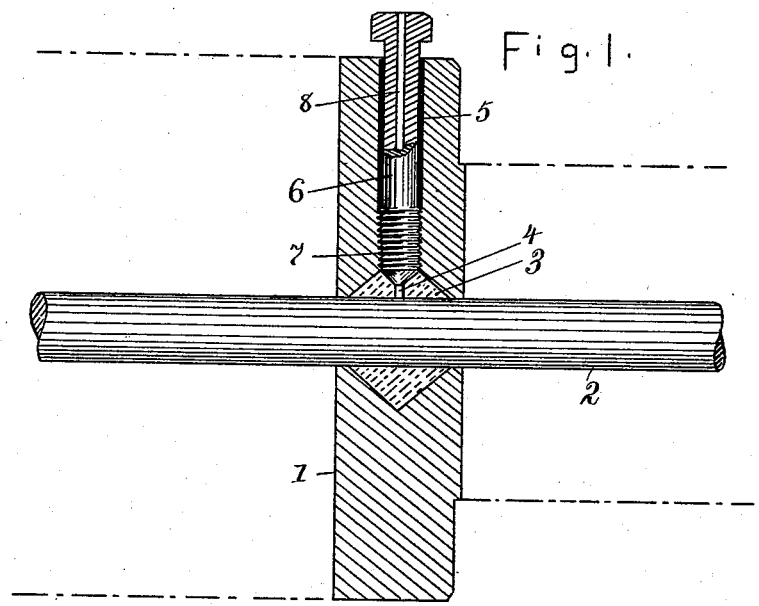
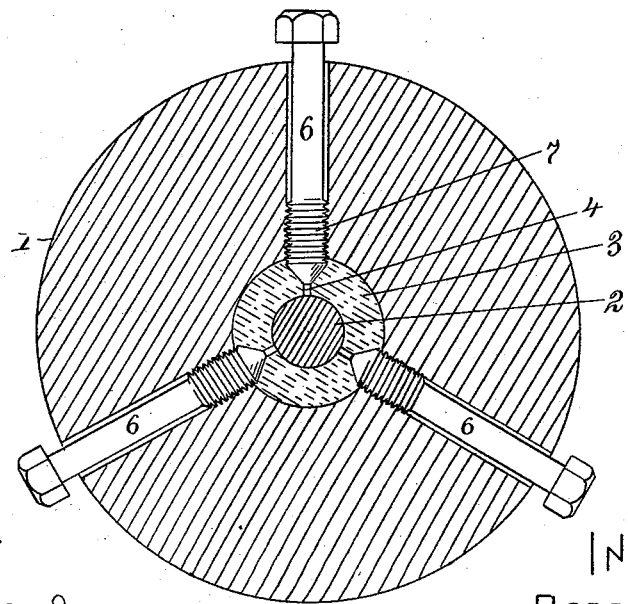
ATTEST
Ina C. Graham
Nora L. Graham
INVENTOR
Robert Holmes.
By his attorney
L. P. Graham

UNITED STATES PATENT OFFICE.

ROBERT HOLMES, OF DANVILLE, ILLINOIS.

METALLIC PACKING.

SPECIFICATION forming part of Letters Patent No. 536,206, dated March 26, 1895.

Application filed December 1, 1894. Serial No. 530,533. (No model.)

*To all whom it may concern:*

Be it known that I, ROBERT HOLMES, of Danville, in the county of Vermilion and State of Illinois, have invented certain new and useful Improvements in Metallic Packing, of which the following is a specification.

This invention relates to packing for piston rods, &c. It is particularly intended for use in a cylinder head between the two cylinders of a tandem compound steam engine. It is designed to permit the placing of the cylinders in close contact one with the other, thus economizing space, to show leakage, when any occurs, to provide for stopping the leakage, and to enable the piston rod bearing to be supplied with oil, while moving or otherwise. It is exemplified in the structure hereinafter described and it is defined in the appended claims.

In the drawings forming part of this specification Figure 1 is a section diametrically through a cylinder head embodying my invention. Fig. 2 is a central vertical section through the head on a plane at right angles with the plane of section in Fig. 1.

The head 1 is particularly intended to form a partition between the two cylinders of a tandem compound steam engine. It is bored centrally to admit the piston rod 2, and it is counterbored, or recessed to form a chamber for the packing 3, which is made of a somewhat plastic metal, or compound, as lead and tin for instance. The head is also bored radially from the periphery to the packing chamber, and is screw-threaded in the bores to receive the threaded ends 7 of bolts 6. The bolts are bored longitudinally, as shown at 8 in Fig. 1, where the bolt is in part shown in longitudinal section, and are preferably cone-shaped on their inner ends. The packing is also bored to coincide with the bores of the bolts, as shown at 4, thus forming continuous passages from the piston rod outward.

If the head is made of a single piece the packing chamber is formed by counterboring, or in any other desirable manner, and the packing metal is melted and poured into the chamber. By casting the head in two pieces the packing may be cast to shape and secured in place by bolting the two parts together. Three bolts, at intervals of one hundred and twenty degrees, are shown in this instance, and each bolt is described as perforated from end to end. This is a preferred, but not indispensable arrangement, as the number and disposition of the bolts may vary, and a part only may be bored.

If the packing is not sufficiently close to prevent passage of steam the fact will be at once announced by the escape of a portion of the steam through the perforations of the packing and the bolts, and may be overcome by setting up the bolts and thereby forcing the packing closely against the piston rod. The perforations, or one of them, may also be used to carry oil to the piston rod bearing.

Having thus described my invention, I claim as new and desire to secure by Letters Patent—

1. A metal packing having a perforation, or perforations, to show leakage, and a longitudinally perforated tightening bolt or bolts, in line with the perforation of the packing, substantially as set forth.

2. The combination of the head, the rod, the chamber in the head, the packing in the chamber having radial perforations, and the longitudinally perforated tightening bolts set in the head in line with the perforations of the packing, substantially as set forth.

In testimony whereof I sign my name in the presence of two subscribing witnesses.

ROBERT HOLMES.

Attest:
FRANK LINDLEY,
MAMIE BALDWIN.